United States Patent
Hummel et al.

(10) Patent No.: US 7,975,800 B2
(45) Date of Patent: Jul. 12, 2011

(54) STEERING DEVICE FOR VEHICLES HAVING A PAIR OF WHEELS WHICH CAN BE STEERED FREELY BY MEANS OF LATERAL FORCES

(75) Inventors: Stefan Hummel, Stuttgart (DE); Falk Hecker, Markgroeningen (DE); Matthias Horn, Hardheim (DE); Herbert Schramm, Leonberg (DE)

(73) Assignee: Knorr-Bremse Systeme Fuer Nutzfahrzeugu GmbH, Munich (DE)

( * ) Notice: Subject to any disclaimer, the term of this patent is extended or adjusted under 35 U.S.C. 154(b) by 1037 days.

(21) Appl. No.: 10/549,399

(22) PCT Filed: Mar. 12, 2004

(86) PCT No.: PCT/EP2004/002594
§ 371 (c)(1),
(2), (4) Date: Dec. 5, 2006

(87) PCT Pub. No.: WO2004/080783
PCT Pub. Date: Sep. 23, 2004

(65) Prior Publication Data
US 2007/0169969 A1    Jul. 26, 2007

(30) Foreign Application Priority Data
Mar. 13, 2003   (DE) .................. 103 10 942

(51) Int. Cl.
*B62D 5/04*    (2006.01)
*B62D 5/06*    (2006.01)
*B62D 13/00*   (2006.01)

(52) U.S. Cl. ........................ 180/445; 180/419

(58) Field of Classification Search .................. 180/419, 180/445
See application file for complete search history.

(56) References Cited

U.S. PATENT DOCUMENTS

| | | | | |
|---|---|---|---|---|
| 3,222,640 A | * | 12/1965 | Wurst | 340/576 |
| 3,499,689 A | * | 3/1970 | Carp et al. | 303/156 |
| 4,782,878 A | * | 11/1988 | Mittal | 152/417 |
| 4,996,525 A | * | 2/1991 | Becker et al. | 340/5.64 |

(Continued)

FOREIGN PATENT DOCUMENTS

| | | |
|---|---|---|
| DE | 29 48 181 | 11/1979 |
| DE | 198 12 238 | 3/1998 |
| DE | 198 03 745 | 8/1999 |

(Continued)

*Primary Examiner* — Kevin Hurley
*Assistant Examiner* — Daniel Yeagley
(74) *Attorney, Agent, or Firm* — Kenyon & Kenyon LLP

(57) ABSTRACT

A steering device for vehicles having a pair of wheels which can be steered freely as a function of the current driving state of the vehicle or whose steered position can be locked by an electronically actuable locking device, having an electronic control device and having sensors which are connected to the electronic control device and have the purpose of monitoring current driving state values, with the electronic control device actuating the locking device when a minimum velocity of the vehicle is exceeded, in such a way that the steered position of the pair of wheels is locked, characterized in that driving state values which characterize critical driving situations are additionally stored in the electronic control device, in which the steered position of the pair of wheels is locked in critical driving situations, and in which, after a critical driving situation, the locking device does not release the pair of wheels again until predefined critical driving state values are undershot at least for a predefined period of time.

14 Claims, 2 Drawing Sheets

U.S. PATENT DOCUMENTS

| | | | |
|---|---|---|---|
| 5,238,077 A * | 8/1993 | Vaughn et al. | 180/415 |
| 5,244,226 A * | 9/1993 | Bergh | 280/442 |
| 5,280,939 A * | 1/1994 | Kee et al. | 280/432 |
| 5,620,194 A * | 4/1997 | Keeler et al. | 280/81.6 |
| 6,105,981 A * | 8/2000 | Buelt et al. | 280/86.751 |
| 6,648,426 B1 | 11/2003 | Boettiger et al. | |
| 2004/0150513 A1* | 8/2004 | Cheng | 340/426.28 |

FOREIGN PATENT DOCUMENTS

| | | |
|---|---|---|
| DE | 100 65 186 | 7/2002 |
| EP | 0 508 431 | 4/1992 |
| EP | 1 215 104 | 6/2002 |
| JP | 59-199372 | 11/1984 |
| JP | 5-294251 | 11/1993 |

* cited by examiner

STEERING DEVICE FOR VEHICLES HAVING A PAIR OF WHEELS WHICH CAN BE STEERED FREELY BY MEANS OF LATERAL FORCES

FIELD OF THE INVENTION

The present invention relates to a steering device for a vehicle according.

RELATED APPLICATION INFORMATION

This application is based on International patent application no. PCT/EP2004/002954, and therefore claims priority to German patent application no. 103 10 942, which was filed on Mar. 13, 2003 in the German patent office. The contents of both applications in their entirety is hereby incorporated by reference.

BACKGROUND INFORMATION

The exemplary embodiments and/or exemplary methods of the present invention relate to a steering device for a vehicle.

A steering device for a vehicle is discussed in German patent document no. 198 03 745. The vehicle discussed there has a freely steerable axle which is also referred to as a self steering axle and whose steering can be locked as a function of predefined operating states of the vehicle. In particular, the intention is that this steering system will be locked when a minimum velocity of the vehicle is exceeded. Furthermore, sensors for sensing the velocity of the vehicle, the steering angle of the steerable axle and brake pressure are provided and are connected to an electronic control device. Depending on predefined measured values of the sensors, the electronic control device releases a locking device for the self steering axle or activates it.

German patent document no. 100 65 186 discusses a hydraulically activated steering device of a utility vehicle with two axles which can be steered actively by a hydraulic system. An electronically controllable damping valve is connected into the hydraulic circuit and can be adjusted to a stored characteristic curve as a function of the load state of the vehicle.

German patent document no. 198 12 238 discusses a method for controlling the yaw behavior of vehicles. Sensors for the vehicle velocity and the steering angles are connected to a control unit which determines the yaw rate of the vehicle. Two independent control circuits for a steering intervention and a braking intervention control the yaw rate in accordance with a predefined setpoint value.

Heavy trucks and many buses have a third axle in addition to a front axle which can be steered by the driver and a driven, nonsteerable rear axle. If the third axle is arranged behind the driven axle, it is referred to as a "trailing axle".

A distinction is made between vehicles in which the third axle is rigid, i.e. cannot be steered, and the vehicles in which it is steerable. In the case of steerable third axles, a distinction is further made between axles which are coupled kinematically to the front axle steering system, i.e. which are also steered automatically by the driver together with the front axle and what are referred to as "lateral force steered axles". Lateral force steered axles are not coupled to the steering system of the vehicle and are therefore also referred to as "freely steerable axles". If the vehicle travels round a bend, laterally directed positive forces arise between the underlying surface and the wheels of the lateral force steered axle and lead to an "automatic" steering lock.

In comparison to other multiaxle vehicles in which a plurality of axles are arranged rigidly, i.e. one behind the other in a nonsteerable fashion, the wear on the tires in vehicles with steerable "additional axles" is less, in particular when cornering at low velocities, and the vehicle has a better turning circle. However it is considered to be disadvantageous that vehicles with one or more freely steerable axles have a smaller degree of "lateral rigidity" and thus worse stability on bends compared to vehicles with nonsteerable axles.

In particular in the case of low coefficients of friction and on a smooth underlying surface, vehicles with freely steerable axles tend to oversteer more readily than vehicles with rigid axles. The tendency to oversteer is increased further if the nonsteered axle is driven and also has to transmit drive forces in addition to the lateral guiding forces.

As understood, vehicles with a second rear axle are known which are steered by lateral force and in which the lateral force steered axle can be locked "where necessary", i.e. in which the degree of freedom of the steering can be locked. The locking or blocking is carried out here exclusively as a function of the velocity of the vehicle, with the axle being locked above a specific minimum velocity. Such vehicles have significantly improved lateral rigidity at relatively high velocities compared to vehicles with a lateral force steered axle which cannot be locked. At the same time, the free steerablility at low velocities allows the wear on tires to be reduced.

SUMMARY OF THE INVENTION

An object of the exemplary embodiments and/or exemplary methods of the present invention is to provide a steering device for further improving the driving stability of vehicles with a lateral force steered axle, in particular in order to reduce the risk of oversteering.

This object may be achieved by the features of the systems and methods described herein. Advantageous refinements and developments are also described herein.

An aspect or feature of the exemplary embodiments and/or exemplary methods of the present invention is to control the locking or blocking of a lateral force steered axle on the basis of a plurality of criteria, specifically as a function of the velocity of the vehicle, and additionally as a function of variables which characterize the instantaneous driving stability or lane holding of the vehicle.

The driving state of a vehicle can be described approximately by a complicated vector variable which is composed, for example, of the components of wheel speeds, wheel acceleration values, slip values at individual wheels, translatory and rotational vehicle acceleration or yaw rate, mass of the vehicle, distribution of axle load, steering angle, engine torque, braking torque at individual wheels etc.

By monitoring a plurality of such variables and by a comparison with predefined "critical" individual values or critical combinations of individual values, the instantaneous driving stability of the vehicle may be estimated more realistically. If a critical driving situation is detected, the driving stability, in particular the lateral stability when cornering, can be improved by locking the lateral force steered axle.

In order to monitor the driving state, an electronic stability system which is usually present in any case in modern vehicles may be used. In addition to the locking of the lateral force steer axle, interventions can also be made into the engine torque, and braking interventions can be made at an individual wheel or at a plurality of wheels.

According to one development of the exemplary embodiments and/or exemplary methods of the present invention, a locking device which is provided for locking the lateral force steered axle is activated by a central electronic control device. If the driving state of the vehicle has stabilized again as a result of the control intervention, the lateral force steered axle can be "released" again.

According to one development of the exemplary embodiments and/or exemplary methods of the present invention, an axle is not released again until predefined values which characterize a critical driving situation are undershot for a specific minimum period of time of, for example, 3-5 sec, i.e. if the vehicle has stabilized for a significantly long time.

The locking device may be capable of being activated hydraulically or pneumatically, for example.

According to one development of the exemplary embodiments and/or exemplary methods of the present invention, steering levers which are connected to one another in an articulated fashion by a track rod are provided on the wheels which are at opposite ends of the lateral force steered axle. One of the two steering levers may have, for example, an "extension" which serves as a locking lever and engages in a locking mechanism.

DETAILED DESCRIPTION

Figure 1:
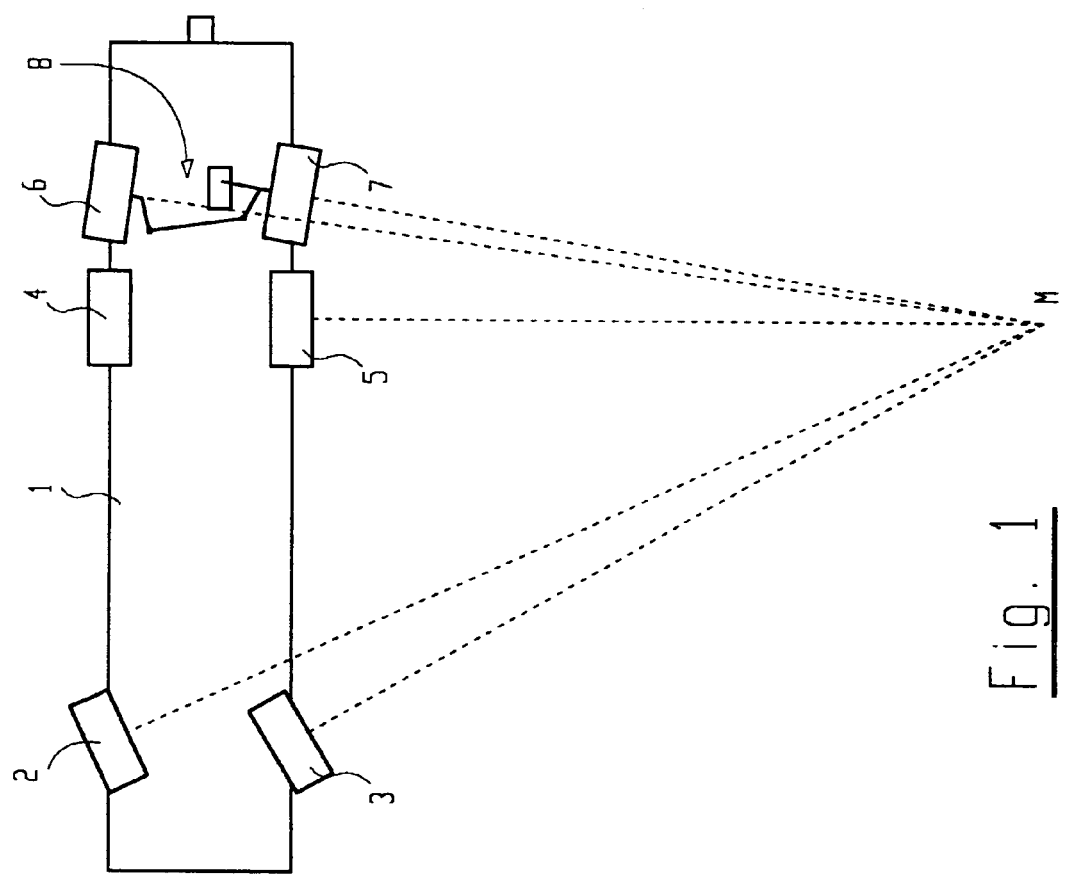
FIG. 1 shows a basic outline of a three-axle vehicle with a lateral force steered axle when cornering.

FIG. 1 shows a vehicle 1, for example a bus, with a front axle which can be steered by the driver by the steering wheel and which is formed by two wheels 2 and 3. The vehicle 1 also has a driven rear axle which is rigid, i.e. cannot be steered, and has rear wheels 4 and 5. "Behind" the rear axle a lateral force steered trailing axle is provided which is formed by the wheels 6 and 7 which are coupled to one another by a steering mechanism 8.

When cornering, the driver predefines a steering lock by the front wheels 2 and 3. When the vehicle is traveling in a stable way, the wheels 6 and 7 which are coupled by the steering mechanism 8 move freely. As a result of the lateral positive forces which occur between the underlying surface and the wheels 6 and 7, a corresponding steering lock is brought about automatically at the lateral force steered axle. In the case of the steering lock of the wheels 2, 3 and 6, 7 shown in FIG. 1 all the wheels 2-7 have a common, imaginary instantaneous pole M which permits stable cornering.

Figure 2:
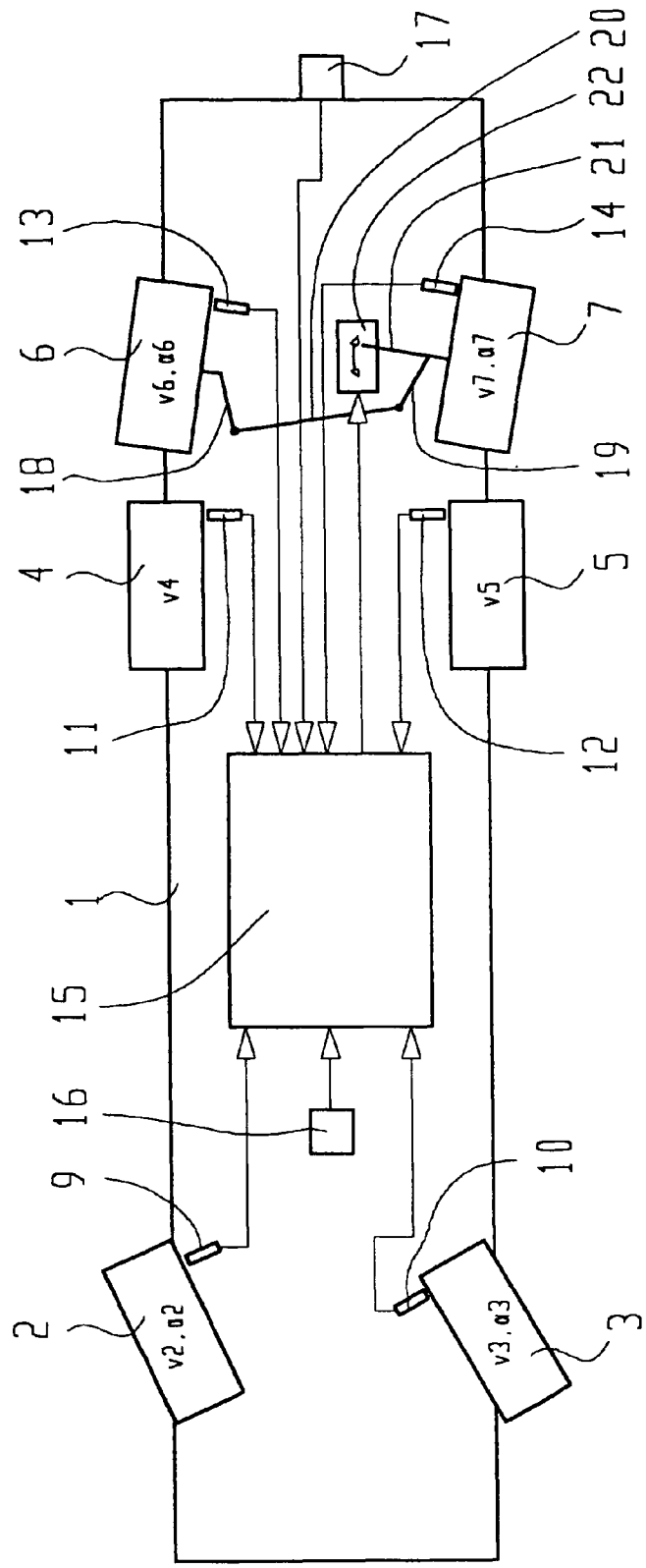
FIG. 2 is a more detailed illustration of the vehicle according to FIG. 1.

FIG. 2 is an enlarged illustration of the vehicle in FIG. 1. Each of the wheels 2-7 is assigned a wheel sensor 9-14 for determining the wheel speeds V2-V7 and for determining the steering angles α2, α3, α6, α7 of the wheels 2, 3, 6, 7. The signals which are supplied by the sensors 9-14 are evaluated by an electronic control device 15. Purely by way of example, two further sensors are illustrated, specifically a yaw rate sensor 16 and a coupling force sensor 17 which determines the coupling force on the king pin. Alternatively or in addition, further sensors may be provided for monitoring the instantaneous driving stability, for example brake pressure sensors for determining the brake pressures at individual wheels, load sensors for determining the axle load distribution and the mass of the vehicle, longitudinal acceleration sensors and/or lateral acceleration sensors etc.

The two wheels 6 and 7 of the lateral force steered axle each have a steering lever 18 or 19 which is permanently connected to the wheel suspension. The two steering levers 18, 19 are connected to one another in an articulated fashion by a track rod 20. The two wheels 6, 7 thus have a common "degree of steering freedom". The steering lever 19 of the wheel 7 has an "extension" which serves as a locking lever 21. When the wheels 6, 7 make steering movement, the locking lever 21 swivels with them. The locking device 22 which is illustrated only schematically here can lock the locking lever 21. Therefore, both wheels 6 and 7 are "locked" by the locking device 22.

The locking device 22 can be actuated electronically by the control device 15, specifically as a function of the velocity of the vehicle and a plurality of measured variables which characterize the driving stability and are sensed by sensors 9-14, 16, 17 which are illustrated only schematically here.

To summarize, the exemplary embodiments and/or exemplary methods of the present invention can be characterized as follows:

An aspect of the exemplary embodiments and/or exemplary methods of the present invention is that, in a vehicle with one or more lateral force steered rear axles, the rear axle steering systems are locked not only as a function of velocity but also in the case of oversteering or in other critical driving situations. This may be done by "retrofitting" an electronic stability system which is provided in any case in the vehicle and which actuates the locking device for the lateral force steered rear axle, i.e. locks when necessary and registers it again after critical situations.

This steering device is suitable, for example, for a bus with three axles in which the central rear axle is driven and the last axle is steered by lateral force and is locked from approximately 40 km/h by pneumatic cylinders or hydraulic cylinders. The bus is equipped, for example, with a conventional electronic stability system which is capable of detecting oversteering. If the oversteering of the bus exceeds a specific threshold value, the locking mechanism is activated by the electronic control device by a digital output using a pneumatic or hydraulic valve, and the lateral force steered rear axle is locked, as a result of which an additional lateral guiding force builds up at the steered rear axle and stabilizes the vehicle. After the vehicle has been traveling straight ahead again in a stable fashion for a certain time, i.e. for a period of time of 3-5 sec, the locking mechanism is released again and the rear axle steering system is released again.

Of course, a plurality of such lockable, lateral force steered axles may also be provided in one vehicle.

What is claimed is:

1. A steering device for a vehicle having a pair of wheels which can be steered freely as a function of the current driving state of the vehicle or whose steered position can be locked by an electronically actuatable locking device, the steering device comprising:
   an electronic control device;
   sensors connected to the electronic control device to monitor current driving state values;
   wherein:
      the electronic control device actuates the locking device when a minimum velocity of the vehicle is exceeded, so that a steered position of the pair of wheels is locked,
      driving state values which characterize critical driving situations are stored in the electronic control device,
      the steered position of the pair of wheels is locked in critical driving situations, and
      after a critical driving situation, the locking device does not release the pair of wheels again until predefined critical driving state values are undershot at least for a predefined period of time.

2. The steering device of claim 1, wherein combinations of the driving state values which characterize the critical driving situations are stored in the electronic control device.

3. The steering device of claim 1, wherein the critical driving situations are assumed to be present when the vehicle tends to oversteer.

4. The steering device of claim 1, wherein the period of time is 3 seconds to 5 seconds.

5. The steering device of claim 1, wherein the electronic control device is integrated into an electronic driving stability system, and an activation of the locking device occurs at a same time as an engine torque intervention or braking intervention which is controlled by the electronic driving stability system.

6. The steering device of claim 1, wherein each wheel of the pair of wheels are arranged on opposite sides of the vehicle, and each wheel of the pair of wheels includes a steering lever, which are articulatedly connected to one another by a track rod.

7. The steering device of claim 6, wherein the locking device acts on one of the two steering levers.

8. The steering device of claim 6, wherein one of the two steering levers includes a locking lever which lengthens the steering lever, and the locking device acts on the locking lever.

9. The steering device of claim 1, wherein the locking device is actuatable pneumatically.

10. The steering device of claim 1, wherein the locking device is actuatable hydraulically.

11. The steering device of claim 1, wherein combinations of the driving state values which characterize the critical driving situations are stored in the electronic control device, wherein the critical driving situations are assumed to be present when the vehicle tends to oversteer, wherein the electronic control device is integrated into an electronic driving stability system, and an activation of the locking device occurs at a same time as an engine torque intervention or braking intervention which is controlled by the electronic driving stability system, and wherein each wheel of the pair of wheels are arranged on opposite sides of the vehicle, and each wheel of the pair of wheels includes a steering lever, which are articulatedly connected to one another by a track rod.

12. The steering device of claim 11, wherein the period of time is 3 seconds to 5 seconds, and wherein the locking device is actuatable one of pneumatically and hydraulically.

13. The steering device of claim 11, wherein the locking device acts on one of the two steering levers.

14. The steering device of claim 11, wherein one of the two steering levers includes a locking lever which lengthens the steering lever, and the locking device acts on the locking lever.

\* \* \* \* \*